United States Patent [19]

Jenny

[11] 4,060,027
[45] Nov. 29, 1977

[54] APPARATUS FOR APPLYING INGREDIENTS

[75] Inventor: Damian Johann Jenny, Zurich, Switzerland

[73] Assignee: Damian J. Jenny AG, Zurich, Switzerland

[21] Appl. No.: 638,935

[22] Filed: Dec. 8, 1975

[30] Foreign Application Priority Data

Dec. 16, 1974 Switzerland .................. 16718/74

[51] Int. Cl.² .................. A21C 9/04; A23P 1/00; B23Q 7/04
[52] U.S. Cl. .................. 99/450.1; 214/1 BT; 221/211
[58] Field of Search .................. 99/345, 472, 494, 516, 99/450.1, 450.6; 214/1 BT, 1 BV, 147 T, 147 R, 349; 302/58; 221/211

[56] References Cited

U.S. PATENT DOCUMENTS

| | | | |
|---|---|---|---|
| 3,089,600 | 5/1963 | Fischer | 214/1 BT |
| 3,209,923 | 10/1965 | Bargel | 214/1 BT |
| 3,704,038 | 11/1972 | Glanemann | 294/64 R |
| 3,826,381 | 7/1974 | Kulig | 214/1 BT |
| 3,951,274 | 4/1976 | Yamamoto | 214/1 BT |

*Primary Examiner*—Harvey C. Hornsby
*Assistant Examiner*—Robert Pous
*Attorney, Agent, or Firm*—Werner W. Kleeman

[57] ABSTRACT

An apparatus for applying ingredients to an edible product, comprising a stepwise advancing conveyor band, work stations arranged along the conveyor band and at which there are applied the ingredients. One of the work stations is equipped with a carriage mounted to be displaceable transversely with respect to the conveyor band. The carriage, when in a first terminal position, is located over the conveyor band and, in a second terminal position, adjacent such conveyor band and over a discharge slide or chute of a receiving container for the ingredients. The carriage is provided with a number of individual suction heads which can be switched-on and switched-off. These suction heads engage into the chute in the second terminal position of the carriage.

3 Claims, 6 Drawing Figures

APPARATUS FOR APPLYING INGREDIENTS

BACKGROUND OF THE INVENTION

The present invention relates to a new and improved construction of apparatus for applying ingredients to an edible product, which apparatus is of the type comprising a stepwise advancing conveyor band, and work stations arranged along the conveyor band and at which there are applied the ingredients.

SUMMARY OF THE INVENTION

It is a primary object of the present invention to provide a new and improved construction of apparatus for applying ingredients or the like to an edible product in a highly reliable, efficient and accurate manner.

Another object of this invention aims at the provision of novel apparatus for depositing ingredients upon an edible product, which apparatus is relatively simple in construction and design, economical to manufacture, extremely reliable in operation, not readily subject to breakdown, and requires a minimum of maintenance and servicing.

A further specific and important object of this invention is directed to the provision of an extensively automatic apparatus rendering possible continuous production of products composed of superimposed layers of ingredients or the like.

Still a further more specific object of the invention relates to apparatus for applying ingredients composed of small particles or constituents, for instance cubes or pieces of bacon, peperoni, ham or other meats, in a relatively easy and improved manner while affording a quite exact dosage of the applied ingredients.

Now in order to implement these and still further objects of the invention, which will become more readily apparent as the description proceeds, the invention is manifested by the features that one of the work stations possesses a carriage mounted to be displaceable transversely with respect to the conveyor band. This carriage is movable between a first terminal position and a second terminal position. In its first terminal position the carriage is located above the conveyor band and in its second terminal position such carriage is located adjacent such conveyor band and above a discharge or outlet chute of a receiving container for the ingredients. The carriage possesses a number of individual suction heads which can be turned-on and turned-off, the suction heads engaging into the chute in the second terminal position of the carriage.

BRIEF DESCRIPTION OF THE DRAWINGS

The invention will be better understood and objects other than those set forth above, will become apparent when consideration is given to the following detailed description thereof, Such description makes reference to the annexed drawings wherein.

DETAILED DESCRIPTION OF THE PREFERRED EMBODIMENTS

Figure 1:
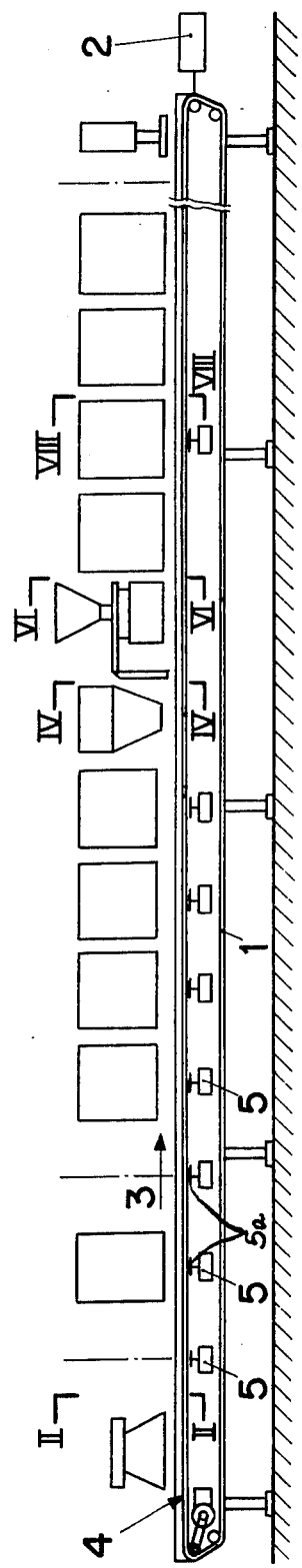
FIG. 1 is a side view of apparatus for the application of ingredients or the like constructed according to the invention.
Figure 3A:
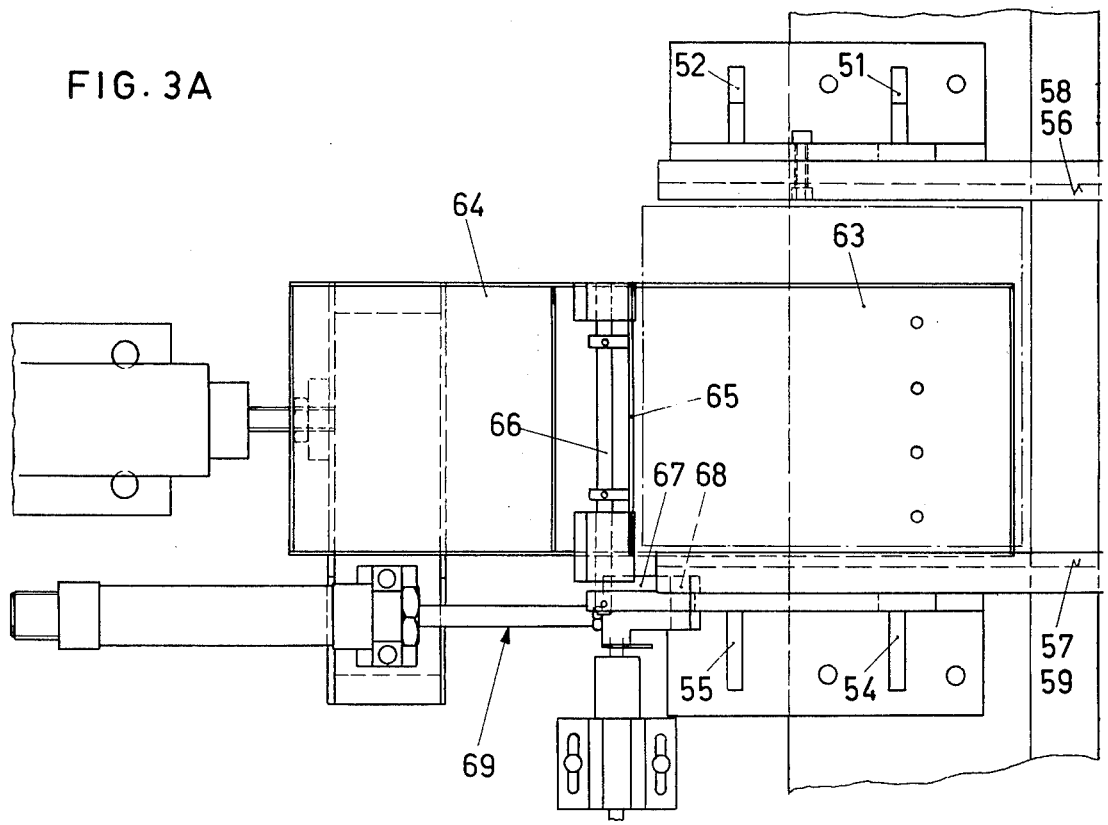
FIGS. 3a and 3b illustrate in top plan view of the work station shown in FIGS. 2a and 2b and FIG. 4 is an enlarged detail view part of the structure shown in FIG. 3b.

Describing now the drawings, it is to be understood only enough of the structure of the apparatus for the application or deposition of ingredients or the like upon an edible product has been shown and will be described in order to enable those skilled in the art to fully understand the underlying concepts and teachings of the present invention. According to the showing of FIG. 1 an endless conveyor band 1 or equivalent conveyor means is driven in a stepwise or incremental fashion by a stepping drive 2 or equivalent structure such that the conveyor band 1 moves in the direction of the arrow 3. In order to produce and decorate an edible product, for instance a pizza, at the starting portion 4 of the conveyor band 1 there is placed a baking tin or tray prepared with dough and during each advancing or feed stroke of the conveyor band 1 the same is successively delivered to the work stations A to Q. At the individual work stations A to Q, and depending upon the recipe, there is applied an ingredient in a predetermined quantity and distribution. At the work stations B, C, D, E, F, G, H and M the conveyor band 1 bears upon the load bowl 5a of an associated balance 5 which has a reference value setting. These balances 5 are precision balances or scales possessing an accuracy of at least 0.01 grams. This accuracy is necessary since with a production of the apparatus of, for instance, several thousand pizzas per day or other products in such large mass produced quantities, even slight balance errors at the individual work stations can result in appreciable losses for the manufacturer. A not particularly illustrated control mechanism places the devices at the individual work stations into operation after each advancing or feed movement of the conveyor band 1 and the associated balance 5 again turns-off such devices after attaining the set reference value. The invention is not limited to any particular control and any conventional control for placing into operation the devices at the individual work stations can be employed.

The main aspects of the invention deal with the construction of an individual work station, such as for instance the work station M, the details of which will now be described. Turning attention to FIGS. 2a, 2b, 3a, 3b, and 4, it will be seen that two essentially parallel guide rails 48 and 49 are stationarily arranged above the conveyor band 1 at the struts or brackets 50, 51, 52, and 53, 54, 55 respectively. In each of the rails 48 and 49 there is provided a linear guide groove 56 and 57, respectively, and a curved guide groove 58 and 59, respectively. Between the rails 48 and 49 there is displaceably mounted a carriage or wagon 60 or equivalent structure. Carriage 60 possesses a first pair of rollers or rolls 61 and a second pair of rollers or rolls 62. The first roller pair 61 travel in the linear guide grooves 56 and 57, whereas the second roller pair 62 travel in the curved guide grooves 58 and 59. The carriage 60 is movable between a first terminal position and a second terminal position. In the first terminal position, as shown in broken lines in FIG. 2b, the carriage 60 is located horizontally over the conveyor band 1 and over a baking tin or tray (not shown) located thereon. In the second terminal position, as shown in phantom lines FIG. 2a, the carriage 60 is located in an inclined orientation or position above a discharge chute or slide 63 merging with an ingredient receiving container or receptacle 64, for instance here assumed to contain as the ingredient peperoni. The discharge chute 63 can be closed by a cover 65 mounted to be pivotable about a stationary shaft or axle 66. In order to open and close the cover 65 a lever 67 is secured to the shaft 66, the free end of lever 67 being articulated at location 68 at a fluid operated piston and cylinder unit, such as the hydraulic or pneumatic piston and cylinder unit 69.

If the carriage 60 is located in the first terminal position shown with broken lines as above discussed, then the piston and cylinder unit 69 rocks the cover 65 downwardly and maintains the chute or slide 63 closed. If the carriage 60 moves into the second terminal position, as shown in phantom lines and as discussed above, then the piston and cylinder unit 69 rocks the cover 65 upwards into the full line position of FIG. 2a. In order to be able to remove peperoni strips $P_1$ (FIG. 4) out of the chute, a multiplicity of suction heads 70 are arranged at the carriage 60. Each suction head 70 possesses a head portion 72 provided with a number of essentially parallel bores or passageways 71 which are connected or in flow communication with a vacuum compartment or chamber 73 arranged in the carriage 60. A substantially cylindrical bore 74 is associated with each suction head 70 and provided in the carriage 60, each such bore 74 being disposed substantially coaxially with respect to its associated head portion 72.

Continuing, in each such bore 74 there is mounted to be axially displaceable a piston 75, the upper end of which is operatively connected with a pneumatic drive 76. At the free end of the piston 75 there are provided thereat pins 77 arranged coaxially with respect to the bores 71 of the associated suction head 70. The length of the pins 77 is advantageously chosen such that in the lower terminal position of the piston 75 these pins protrude with their lower free end downwardly out of the bores 71, as best seen by referring to the pins located at the right-hand side of the showing of FIG. 4. Moreover, there is secured a centering pin 78 in the head portion 72, this centering pin engaging with an appropriate bore 79 of the associated piston 75. This centering pin, during the downward movement of the piston 75, insures for the axial alignment between the pins 77 and the bores 71. The vacuum chamber or compartment 73 is connected with any suitable, conventional and therefore not particularly illustrated suction or vacuum source.

Figure 2A:
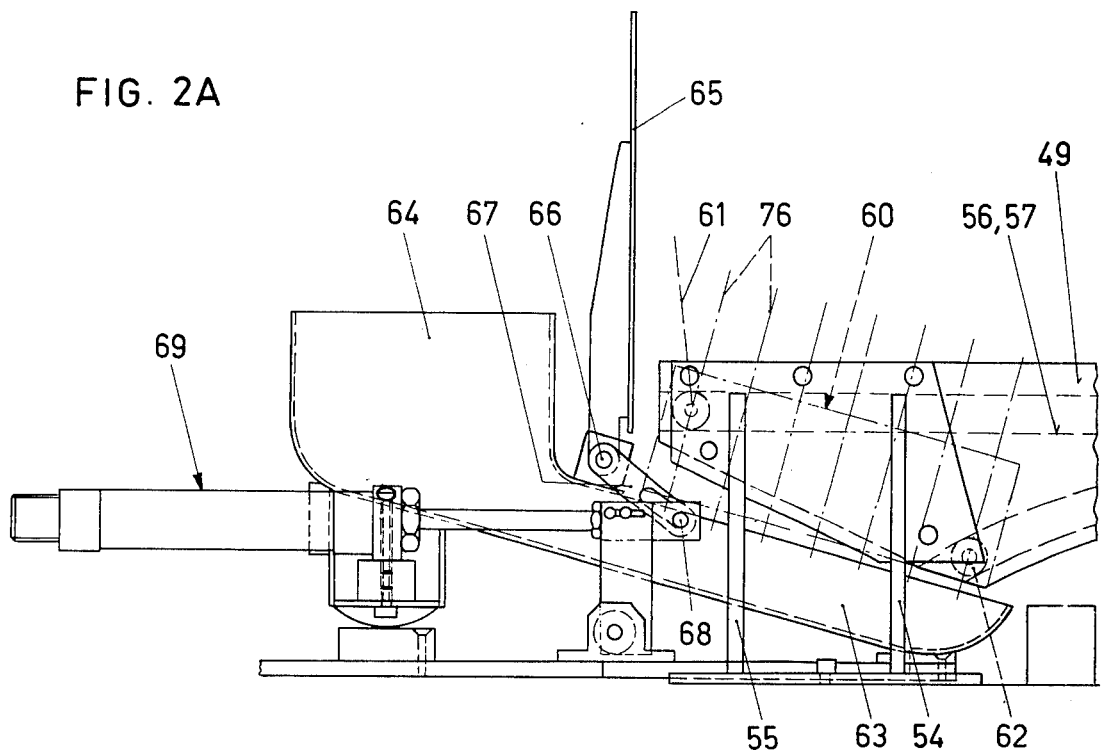
FIGS. 2a and 2b illustrate in an enlarged sectional view taken substantially along the line VIII—VIII of FIG. 1 one of the work stations designated by reference character M.
Figure 2B:
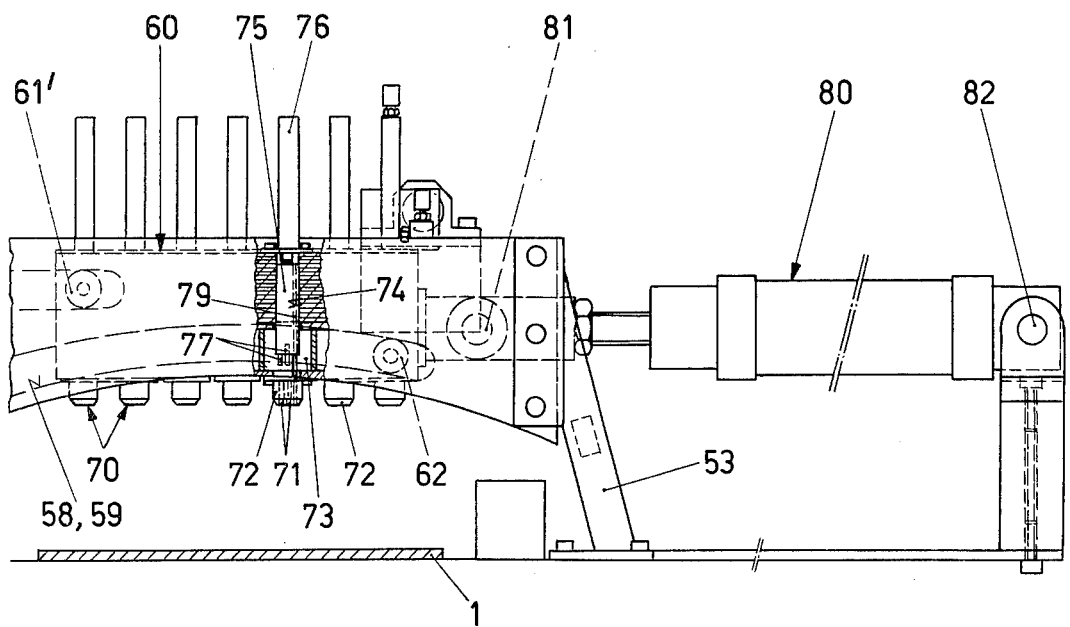
Figure 3B:
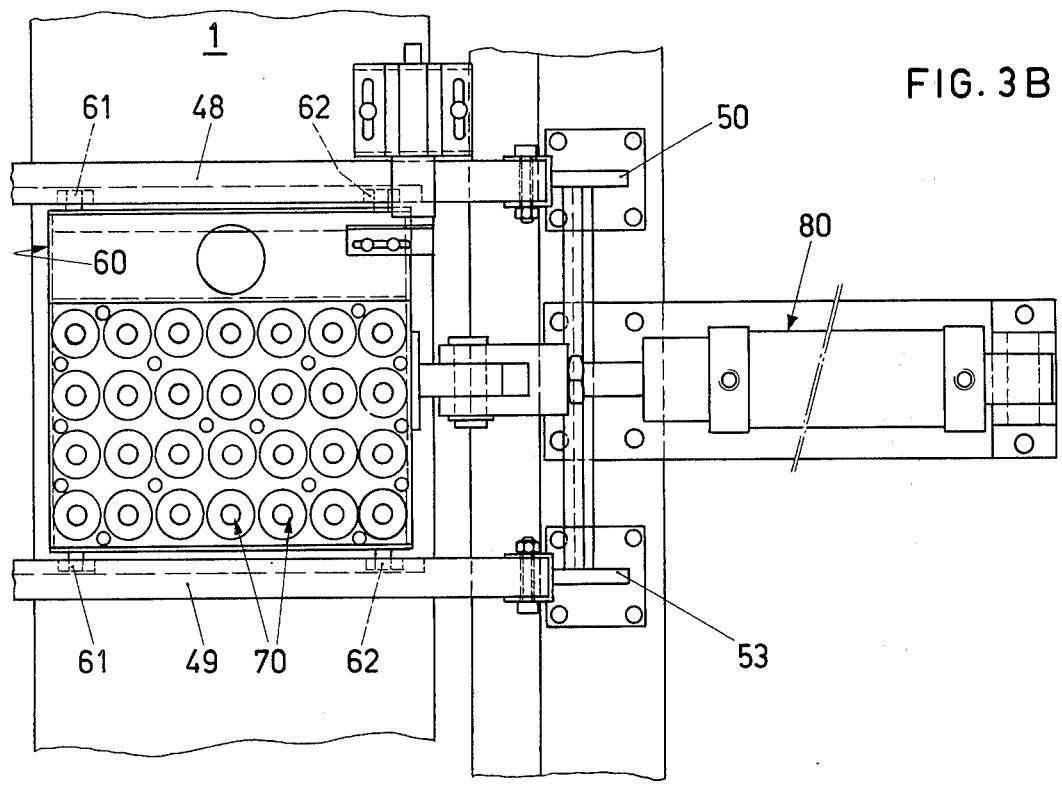
Figure 4:
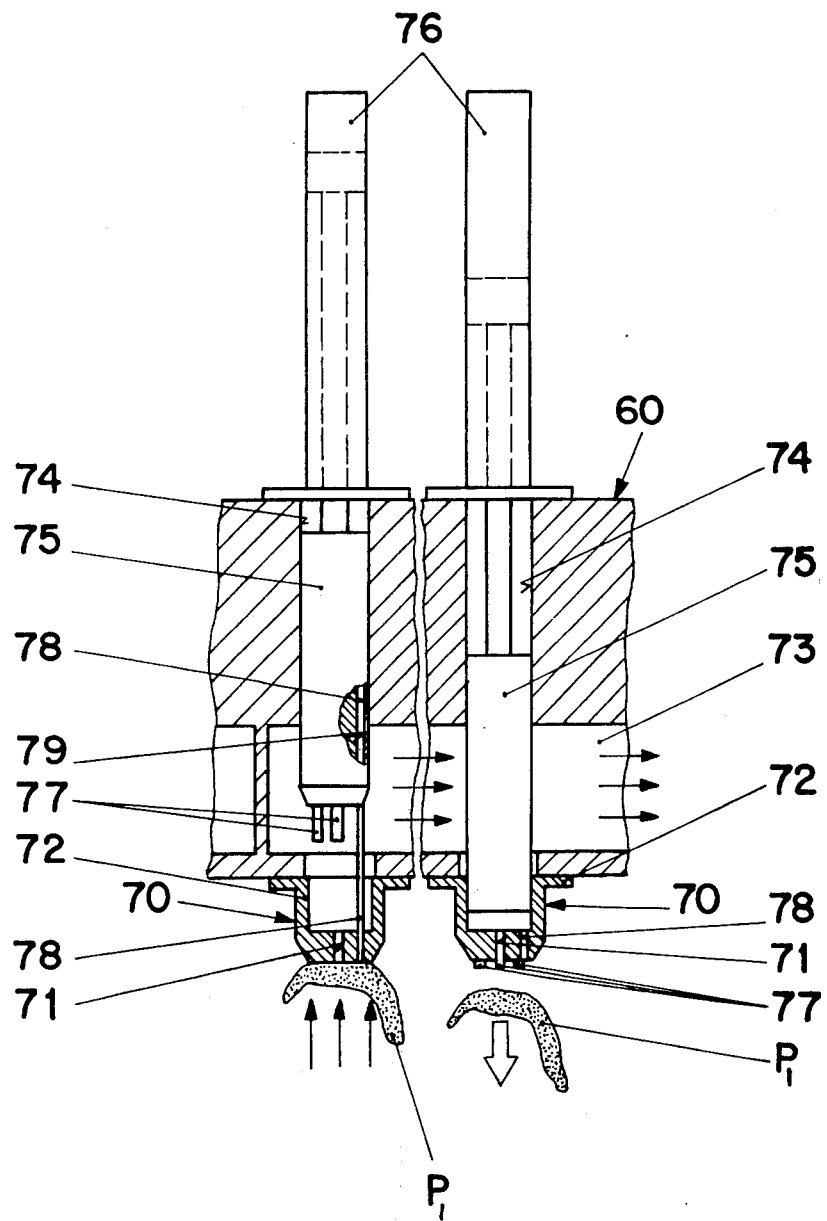

Having now had the benefit of the foregoing discussion of the apparatus, its mode of operation will be considered and is as follows:

The carriage 60 is shifted out of its first terminal position, indicated by broken lines in FIG. 2b, into its second terminal position by means of a piston and cylinder unit 80. This piston and cylinder unit 80 is articulated on the one hand at the shaft or axle 81 connected with the carriage 60 and on the other hand at a stationary shaft or axle 82. During this displacement of the carriage 60 the pistons 75 are in their lower terminal position where the pins 77 thereof engage into and through the bores 71. At the same time the piston and cylinder unit 69 rocks or pivots the cover 65 upwards and frees the chute or slide 63. When the carriage 60 has reached its second terminal position the pistons 75 are raised. By means of the negative pressure or vacuum prevailing in the vacuum chamber or compartment 73 ingredients, here assumed to be peperoni strips $P_1$, are sucked-up by the head portions 72. Thereafter the piston and cylinder unit 80 moves the carriage 60 back into the first terminal position, and the piston and cylinder unit 69 rocks the cover 65 downwards and closes the chute 63. When the carriage 60 has reached its first terminal position then the pistons 75 are lowered. As soon as the pins 77 close the bores 71 the peperoni strips $P_1$ which are sucked against the head portions 72 fall downwards onto a baking tin or tray or the like supported upon the conveyor band 1. Any peperoni strips possibly adhering to one of the head portions 72 are ejected by the ends of the pins 77 protruding out of the bores 71 as soon as the piston 75 approaches its lower terminal position. At the same time the bores 71 are cleaned by means of the pins 77 of any substances which might have entered therein. During the next work cycle the above described working operation or procedure repeats. By actuating only individual ones of the suction heads it is possible to deposit the peperoni strips or otherwise in a decorative manner and pattern, for instance in a cross configuration or rectangular form upon the baking tin. The use of the described work station M is not limited to the dosed application of peperoni strips. It is possible to apply by means of such work station in a dosed manner any type of non-entwined particles which are in a random arrangement.

At the work stations C, E, F, G, H, L and N there can be employed conventional vibrating conveyors or the like, so that further discussion of these work stations is not necessary.

While there are shown and described present preferred embodiments of the invention, it is to be distinctly understood that the invention is not limited thereto, but may be otherwise variously embodied and practiced within the scope of the following claims. Accordingly,

What is claimed is:

1. An apparatus for applying ingredients to an edible product, comprising a conveyor band, means for stepwise advancing said conveyor band, at least one work station arranged along the conveyor band for the application of at least one type of ingredient to the edible product, a carriage, means mounting the carriage to be movable transversely with respect to the direction of movement of the conveyor band, means for displacing the carriage transversely with respect to the direction of movement of the conveyor band between a first terminal position and a second terminal position, a receiver container for the ingredient, said receiver container being provided with a discharge chute, said carriage when located in its first terminal position being disposed above the conveyor band and when in its second terminal position being located adjacent the conveyor band and above said discharge chute of the receiving container, said carriage being provided with a plurality of individual suction heads which engage with the discharge chute in the second terminal position of the carriage, each suction head comprises a head portion equipped with substantially parallel bores, means defining a vacuum compartment flow communicating with said substantially parallel bores, a piston displaceable in the carriage provided substantially coaxially with respect to each head portion, said piston having a leading end provided with pins which engage into said bores when the piston assumes a lower terminal position for closing said bores, said piston being movable into an upper terminal position where said bores are freed.

2. The apparatus as defined in claim 1, further including means for selectively rendering effectual and ineffectual the individual suction heads.

3. The apparatus as defined in claim 1, wherein said pins are longer than the length of the bores and free ends of the pins extend out of the bores in the lower terminal position of the piston.

* * * * *